US010757566B2

(12) United States Patent
He et al.

(10) Patent No.: US 10,757,566 B2
(45) Date of Patent: Aug. 25, 2020

(54) USER EQUIPMENT CAPABILITY REPORTING

(71) Applicant: INTEL IP CORPORATION, Santa Clara, CA (US)

(72) Inventors: Hong He, Beijing (CN); Youn Hyoung Heo, San Jose, CA (US); Kyeongin Jeong, Portland, OR (US); Naveen Palle, San Diego, CA (US); Siddharth Verma, Poway, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/743,562

(22) PCT Filed: Dec. 21, 2015

(86) PCT No.: PCT/US2015/067158
§ 371 (c)(1),
(2) Date: Jan. 10, 2018

(87) PCT Pub. No.: WO2017/027057
PCT Pub. Date: Feb. 16, 2017

(65) Prior Publication Data
US 2018/0206113 A1  Jul. 19, 2018

Related U.S. Application Data

(60) Provisional application No. 62/204,850, filed on Aug. 13, 2015.

(51) Int. Cl.
*H04W 8/24* (2009.01)
*H04B 7/06* (2006.01)

(52) U.S. Cl.
CPC .............. *H04W 8/24* (2013.01); *H04B 7/0628* (2013.01)

(58) Field of Classification Search
CPC . H04W 72/0453; H04W 88/02; H04W 28/06; H04W 72/02; H04W 28/20;
(Continued)

(56) References Cited

U.S. PATENT DOCUMENTS

2010/0130137 A1* 5/2010 Pelletier ................ H04W 72/04
455/68
2011/0267978 A1* 11/2011 Etemad ................... H04L 5/003
370/254
(Continued)

FOREIGN PATENT DOCUMENTS

WO  20150142248 A1  9/2015

OTHER PUBLICATIONS

International Search Report and Written Opinion for International Patent Application No. PCT/U52015/067158 dated Mar. 14, 2016; 17 pages.
(Continued)

*Primary Examiner* — Nizar N Sivji
(74) *Attorney, Agent, or Firm* — Fish & Richardson P.C.

(57) ABSTRACT

Embodiments of the present disclosure describe methods and apparatuses for UE capability reporting in mobile communication systems. UE capability reporting in LTE with high number of CCs (32) creates a great signalling overhead. An enhanced network enquiry message (UECapabilityEnquiry) is proposed which includes indications (e.g. maximum aggregated CC number or bandwidth class, MIMO/CSI-process capabilities) that indicate to a UE that the UE is to exclude, from its capability report (UECapabilityInformation), information related to functions that the network either does not support or is not interested in. The enhanced network enquiry message may include indications of a max. number of DL/UL CCs for which the UE is requested to provide supported CA band combinations and non-CA bands. The UE selects a subset of CA capabilities based on these indicator and generates a UE capability response (UECapabilityInformation) including information related to the selected subset of CA capabilities.

13 Claims, 7 Drawing Sheets

(58) Field of Classification Search
CPC ....... H04L 5/001; H04L 1/0026; H04B 1/006; H04B 7/0452; H04B 1/44
See application file for complete search history.

(56) References Cited

U.S. PATENT DOCUMENTS

| | | | |
|---|---|---|---|
| 2012/0155272 A1* | 6/2012 | Quan | H04W 72/048 370/235 |
| 2017/0111910 A1* | 4/2017 | Sundar | H04W 72/0453 |
| 2017/0251478 A1* | 8/2017 | Kim | H04W 72/0453 |

OTHER PUBLICATIONS

Alcatel-Lucent; "Selective UE capability reporting," Agenda Item: 5.5, 3GPP TSG-RAN WG2#86, R2-142435; Seoul, South Korea, May 19-23, 2014; 4 pages.
Ericsson; "CA band combination capability signaling," Agenda Item: 6.1.1.1, 3GPP TSG-RAN WG2 #85bis, Tdoc R2-142727; Seoul, South Korea, May 19-23, 2014; 15 pages.
Huawei, Hisilicon; "UE CA capability signalling for B5C," Agenda Item: 7.2.2.1, 3GPP TSG-RAN WG2 Meeting #90, R2-152245; Fukuoka, Japan, May 25-29, 2015; 3 pages.
Intel Corporation; "Discussion on UE capability signaling for B5C," Agenda Item: 7.2.2.1, 3GPP TSG RAN WG2 Meeting #91bis, R2-154293; Malmo, Sweden, Oct. 5-9, 2015; 5 pages.
3GPP TS 36.331 V12.6.0 (Jun. 2015); "Technical Specification Group Radio Access Network; Evolved Universal Terrestrial Radio Access (E-UTRA); Radio Resource Control (RRC); Protocol specification (Release 12)," 449 pages.

* cited by examiner

USER EQUIPMENT CAPABILITY REPORTING

CROSS REFERENCE TO RELATED APPLICATIONS

The present application is a national phase entry under 35 U.S.C. § 371 of International Application No. PCT/US2015/067158, filed Dec. 21, 2015, entitled "USER EQUIPMENT CAPABILITY REPORTING", which claims priority to U.S. Provisional Patent Application No. 62/204,850, filed Aug. 13, 2015, entitled "UE Capability Report in Mobile Communication System," the entire disclosures of which are hereby incorporated by reference for all purposes.

FIELD

Embodiments of the present disclosure generally relate to the field of wireless communication, and more particularly, to apparatuses and methods for user equipment capability reporting in mobile mutation systems.

BACKGROUND

Third Generation Partnership Project (3GPP) Release 12 provides carrier aggregation (CA) capability up to five component carriers (CCs). One of the objectives of 3GPP Release 13 is to enhance CA capability up to 32 CCs. Supporting such a high number of CCs may complicate control and data signaling across the radio interface.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
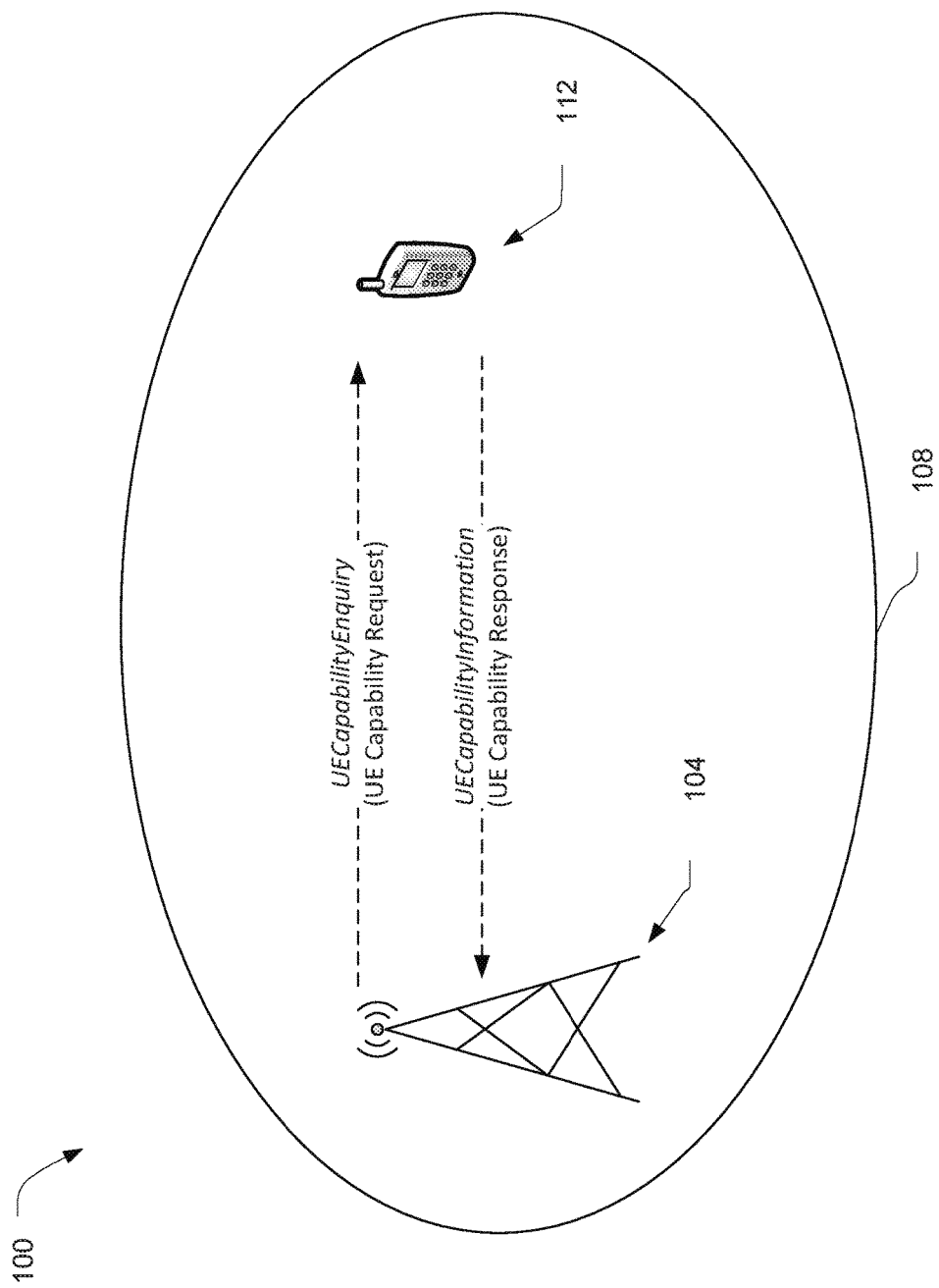
FIG. 1 illustrates a communication environment in accordance with some embodiments.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Carrier aggregation may be used in a Long Term Evolution (LTE) network to increase bandwidth by utilizing multiple component carriers (CCs) in the downlink (DL) or uplink (UL). Each CC may have its own bandwidth of, for example, 1.4, 3, 5, 10, 15, or 20 megaHertz (MHz). The CCs may be intra-band, contiguous (each CC is contiguous with another CC and all are in the same operating frequency band), intra-band, noncontiguous (at least one CC is not contiguous with another CC and all are in the same operating frequency band), or inter-band noncontiguous (CCs are distributed throughout two or more operating frequency bands). Operating frequency bands may also be referred to as "evolved universal terrestrial radio access (E-UTRA) bands" or simply "bands."

A carrier aggregation (CA) bandwidth class may indicate a combination of maximum aggregated transmission bandwidth configuration (ATBC), which may refer to a total number of aggregated physical resource blocks (PRBs), and a maximum number of CCs. 3GPP Release 11 defines three classes: Class A with an ATBC≤100 and a maximum number of CCs=1; Class B with an ATBC≤100 and a maximum number of CCs=2; and Class C with 100<ATBC≤200 and a maximum number of CCs=2. Other, later releases may have additional/alternative classes.

A CA configuration may indicate a particular combination of bands and CA bandwidth classes for each band. For example, a CA configuration "CA_1C" may indicate intra-band contiguous CA on E-UTRA operating band 1 and CA bandwidth class C; CA configuration "CA_1A_1A" may indicate intra-band, non-contiguous CA on band 1 and CA bandwidth class A; and CA configuration "CA_1A_5A" may indicate inter-band CA on bands 1 and 5 with CA bandwidth class A.

Multiple input multiple output (MIMO) may also be used in LTE networks to increase overall bitrate by utilizing multiple transmit/receive antennas to communicate one or more data streams (or "layers"). Embodiments transmitting different data streams over different transmit antennas may do so using the same resources in both frequency and time. The data streams may be separated at the receiver through the use of different reference signals.

Another technique used for increasing transmission efficiencies in LTE networks is coordinated multipoint (CoMP). CoMP may provide for transmission/reception of signals to a UE using a group of cooperating transmission points (TPs). The network may use channel state information (CSI), reported by the UE, to make CoMP transmission decisions. A UE may be configured with a number of CSI processes that may be used to generate CSI reports. A CSI process may include a CSI reference signal (CSI-RS) resource, a CSI interference measurement (CSI-IM) resource, and a reporting mechanism. For each CSI process, the UE may report calculated CSI indicators periodically according to CQI reporting configuration provided by network or as requested by the network. The CSI indicators may include a channel quality indicator (CQI), a rank indicator (RI), and precoder matrix indicator (PMI).

Different UEs may include different CA and MIMO capabilities. In order for the network to communicate efficiently with a UE, it will need to know information about these capabilities. In legacy systems, a UE may provide supported downlink (DL) CA bandwidth classes and corresponding MIMO capabilities for each band in a CA band combination. A CA band combination (or simply "band combination"), as used herein, may refer to a combination of bands that the UE supports for CA communication. The UE may also provide supported uplink (UL) CA bandwidth class and corresponding MIMO capabilities for at least one band in the band combination. A MIMO capability reported by the UE may apply to all component carriers of a CA bandwidth class of a band in an indicated band combination.

As the number of component carriers supported by CA increase to 5 CCs and beyond (for example, up to 32 CCs in LTE Release 13), the total size of the information corresponding to UE capability may increase dramatically. This is true even if it is assumed that there is a maximum number of eight frequency bands to be aggregated and only contiguous carriers in unlicensed bands are used. The potentially large size of the UE capability reporting may not be handled efficiently by current networks.

Embodiments of the present disclosure describe techniques for UE capability reporting that effectively reduces the signaling overhead while still providing sufficient flexibility to provide relevant information to the network.

In some embodiments, an enhanced network enquiry message may be provided. The enhanced network enquiry message may include network-provided indications, for example, in information elements (IEs), that indicate to a UE that the UE is to exclude, from its capability report, information related to functions that the network either does not support or is not interested in. Further, some embodiments describe network-provided indications of a maximum aggregated CC number (or bandwidth class) or MIMO/CSI-process capabilities to further reduce a size of the report. More specifically, the enhanced network enquiry message may include one or both of two following Information Elements (IEs), one indicating a maximum number of downlink CCs for which the UE is requested to provide supported CA band combinations and non-CA bands, and the other is used to indicate a maximum number of uplink CCs for which the UE is requested to provide supported CA band combinations and non-CA bands.

Some embodiments teach a set-based MIMO/CSI process capability reporting. Such embodiments may define a set of supported combinations of MIMO/CSI-processes. The set may be defined in a table form to facilitate indication by the UE of the parameters of various band combinations with a smaller bits number.

Some embodiments teach the decoupling of signaling UL and DL band combination parameters. A typical UE may support a relatively limited number of UL CA band combinations capabilities and a relatively larger number of DL CA band combinations capabilities. Using existing UE capability reporting techniques may result in repeated UL band combination reports in many band combinations that have different DL band combination capabilities.

These and other embodiments designed to reduce UE-capability signaling overhead are described in further detail below.

FIG. 1 illustrates a communication environment 100 in accordance with some embodiments. The communication environment 100 may include an eNB 104 that provides a cell 108. A UE 112 may be attached to, for example, communicatively coupled with, the cell 108. In this context, the cell 108 may be referred to as a serving cell of the UE 112 and the UE 112 may be in a radio resource control (RRC)-connected state with the eNB 104.

In some embodiments, the eNB 104 may be part of an evolved universal terrestrial radio access network (E-UTRAN) that provides a radio interface consistent with specifications and protocols developed by the 3rd Generation Partnership Project (3GPP) including, but not limited to, LTE TSs. As used herein, "LTE" may refer generically to releases associated with the original LTE, LTE-Advanced (LTE-A), 5G, etc. In other embodiments, the eNB 104 may be part of other cellular systems such as, but not limited to, Global System for Mobile Communication (GSM), General Packet Radio Service (GPRS), Universal Mobile Telecommunications System (UMTS), High Speed Packet Access (HSPA), Evolved HSPA (E-HSPA), etc.

The components of the communication environment 100 may engage in a UE-capability transfer to transfer UE radio access capability information from the UE 112 to the E-UTRAN through the eNB 104. The eNB 104 may send a UE capability request in, for example, a UE Capability Enquiry (UECapabilityEnquiry) message to the UE 112 when the eNB 104 needs additional UE radio access capability information (also referred to as "capability information").

The UE 112 may generate and transmit a UE capability response in, for example, a UE Capability Information (UECapabilityInformation) message providing the requested capability information to the eNB 104.

Presently, a network may be able to indicate a list of frequency bands for which the UE 112 is requested to provide supported CA band combinations and non-CA bands. The embodiments described herein add other conditions to further reduce the reported band combinations by the UE 112.

In some embodiments, the UE capability request may include an indication that the UE 112 is to only report on certain band combinations. The UE 112 may then select a subset of its CA capabilities to report based on the indication. For example, in some embodiments, the eNB 104 may include an indication that the UE 112 is to report on band combination I (including bands 1 and 3), band combination II (including bands 1 and 4), and band combination III (including bands 1, 2, and 5). If the UE 112 supports band combinations I, II, and IV (including bands 1, 2, and 3), the UE 112 may provide an indication, in the UE capability response, that the UE 112 supports band combinations I and II. Because the eNB 104 did not provide an indication that the network was interested in whether the UE 112 supported band combination IV, providing information about it being supported in the UE capability response is unnecessary for the network's purposes.

In some embodiments, UE capability request may indicate that capabilities that relate to a particular set of functions should be excluded from the UE capability response. These functions may be those that the network either does not support or is not interested in for one reason or another.

In some embodiments, these functions may include one or more of the following: dual connectivity (for example, introducing a new information element named dcRequest); multiple timing advance; simultaneous transmit/receive; network-assisted interference cancellation and suppression (NAICS); sidelink support (for device-to-device communication); transmission modes; and supported bandwidth combination sets (BCSs).

The indication may be an explicit or implicit indication. For example, UE capability request may provide an explicit dual connectivity request (dcRequest) information element (IE) that indicates a positive request (for example, the UE should report on dual connectivity capabilities) or a negative request (for example, the UE should not report on dual connectivity capabilities). Alternatively, the UE capability request may provide an implicit indication based on a default assumption of the UE 112. For example, the UE 112 may assume that it should not report on the dual connectivity capabilities unless the UE capability request includes a dcRequest IE, or vice versa. Thus, the UE 112 may, in selecting the subset of CA capabilities on which to report, omit UE capabilities for certain features if there is no explicit eNB request for information about those features.

The indications to only report certain CA combinations or to exclude a set of functions in the capability request may be provided in one or more optional fields of IEs in the UECapabilityEnquiry message.

In some embodiments, the indication to exclude capability reports corresponding to a set of functions may be restricted to certain indicated band combinations. For example, the UE capability report may indicate that a report regarding NAICS capability is not desired for band combination I. The UE 112 may then only provide NAICS capabilities for other reported band combinations.

In some embodiments, the UE capability request may include an indication of CA bandwidth classes (BWCs) or a combination of CA BWC and MIMO capabilities to facilitate a filtering of UE capability reporting. The UE 112 may only include supported band combinations of the bands that match the indicated BWC or BWC+MIMO capabilities in the UE capability response. For example, if the UE capability request includes an indication that information regarding band combinations with CA bandwidth class A and 2-layer MIMO capability is desired, the UE 112 may include, in the UE capability response, only those band combinations that the UE 112 supports with CA bandwidth class A and 2-layer MIMO capability. The UE 112 may exclude from the UE capability response supported band combinations with other CA bandwidth classes or MIMO capabilities.

In some embodiments, the UE capability request may include an indication of a limitation on reported UL CA capabilities in terms of maximum number of component carrier for DL band combinations or UL band combinations or two values independent for DL and UL, aggregated CA bandwidth, or MIMO capabilities. For example, the UE capability request may include an indication that the UE 112 is to report all band combinations supported by the UE having a certain number of component carriers (or aggregated CA bandwidth or MIMO capabilities). For example, the UE capability request may include an indication that the UE 112 is to report all band combinations that include one or two uplink component carriers. Thus, the UE 112 may select, from all band combinations supported by the UE 112, those band combinations that include one or two uplink component carriers.

In some embodiments, the UE 112 may omit UE capabilities if there is no specific request from the eNB 104 (for example in case the eNB 104 is a legacy eNB) or may send a minimum capability only. For example, in case of supported bandwidth combination sets, if the UE only supports set 0, the UE 112 may not need to include a bitmap of supported bandwidth combination sets.

In some embodiments, the UE capability request may indicate that the UE 112 is to report on a first category of capabilities. If the UE 112 does not support the first capabilities, it may, as an alternative, provide an indication of supporting a second category of capabilities that is related to, but less than, the first category of capabilities. For example, if the UE capability request provides an indication that the UE 112 is to report on asynchronous dual connectivity capabilities of the UE 112 (for example, the first category of capabilities) and the UE only supports synchronous dual connectivity (for example, a second category of capabilities that is below the first category), the UE 112 may omit an indication of the asynchronous support (as it is not supported) but may provide an indication of synchronous dual connectivity support.

In some embodiments, the UE 112 may provide an indication that the UE 112 supports features in addition to the set of features for which capability information is requested through the UE capability request. For example, the UE 112 may set one bit in the UE capability response to indicate that the UE 112 supports the one or more additional features. Alternatively, the UE 112 may set one bit in the UE capability response for each additional feature supported.

In some embodiments, to ensure backward capability, the enhanced inquiry mechanisms may be restricted to band combinations with more than five component carriers. Thus, legacy equipment that uses five or fewer component carriers may not be negatively affected. Alternatively, with appropriate updates to relevant TSs, the embodiments provided herein may also apply to band combinations with five component carriers or fewer, for example, 2, 3, or 4 component carriers.

Some embodiments provide a set-based MIMO/CSI-process capability reporting. A list of MIMO/CSI combination sets may be preconfigured or otherwise defined that may be typically implemented corresponding to a particular aggregated channel bandwidth class (for example, A, B, C, D, E, F) with the respective aggregated CCs number. In some embodiments, correspondence between MIMO/CSI combination set and aggregated channel bandwidth class may be due to those elements sharing computational resources (e.g., baseband resources) of the UE 112.

Each MIMO/CSI combination set may include a MIMO capability (for example, two or four layers) and a CSI process number (for example, 1, 3, or 4) that corresponds to a supported band combination. Table 1 illustrates an example definition of a list of MIMO/CSI combination sets for CA in accordance with some embodiments.

TABLE 1

| MIMO/CSI combination set | MIMO layers | CSI process |
| --- | --- | --- |
| 0 | $X_0$ | $Y_0$ |
| 1 | $X_1$ | $Y_1$ |
| ... | ... | ... |

One entry corresponding to a particular MIMO/CSI combination set of Table 1 may be indicated by the UE 112 per band combination. For example, the UE 112 may transmit in the UE capability report an indication that band combination 1 is supported with MIMO/CSI combination set 1. This may reduce an amount of information bits that would be sent were the UE 112 to report MIMO capability and CSI process for each bandwidth class/band/band combination. Absence of an IE indicating a MIMO/CSI combination set in a particular band combination may, in some embodiments, mean that a default UE MIMO/CSI process capability is to be inferred. The inferred MIMO/CSI process capability may be preconfigured or otherwise defined.

In some embodiments, to provide more flexibility for the UE 112, a two-step MIMO/CSI process capability signaling may be used for UE capability reporting.

In a first step, the UE 112 may determine a maximum number of MIMO/CSI process combination sets allowed by the network. The maximum number may be preconfigured (for example, in a 3GPP TS) or otherwise defined (for example, defined in RRC signaling). For example, some embodiments may provide that a maximum number of up to four or eight MIMO/CSI process combination sets are allowed to be included. It may then be up to the UE 112 to generate the list of a number of MIMO/CSI process combination sets, up to the maximum number, that are supported by the UE 112. The UE 112 may then transmit this list to the eNB 104 by including it in the reported UE capability IE or providing it in a message to the eNB 104 transmitted prior to the reported UE capability IE.

In a second step, the UE 112 may further provide an indication of a supported MIMO/CSI process combination set per band per band combination with reference to the list provided to the eNB 104 in the same or UE capability IE sent earlier by UE.

In some embodiments, to further reduce the size of the UE capability report, the UE 112 may indicate a supported MIMO/CSI process capability per aggregated CA bandwidth (for example, 100, 200, 300, 400 PRBs) for a set of band combinations (for example, contiguous or noncontiguous CA on 5 gigahertz band considering radio channel similarities) by referring to the list generated in the first step described above.

Figure 2:
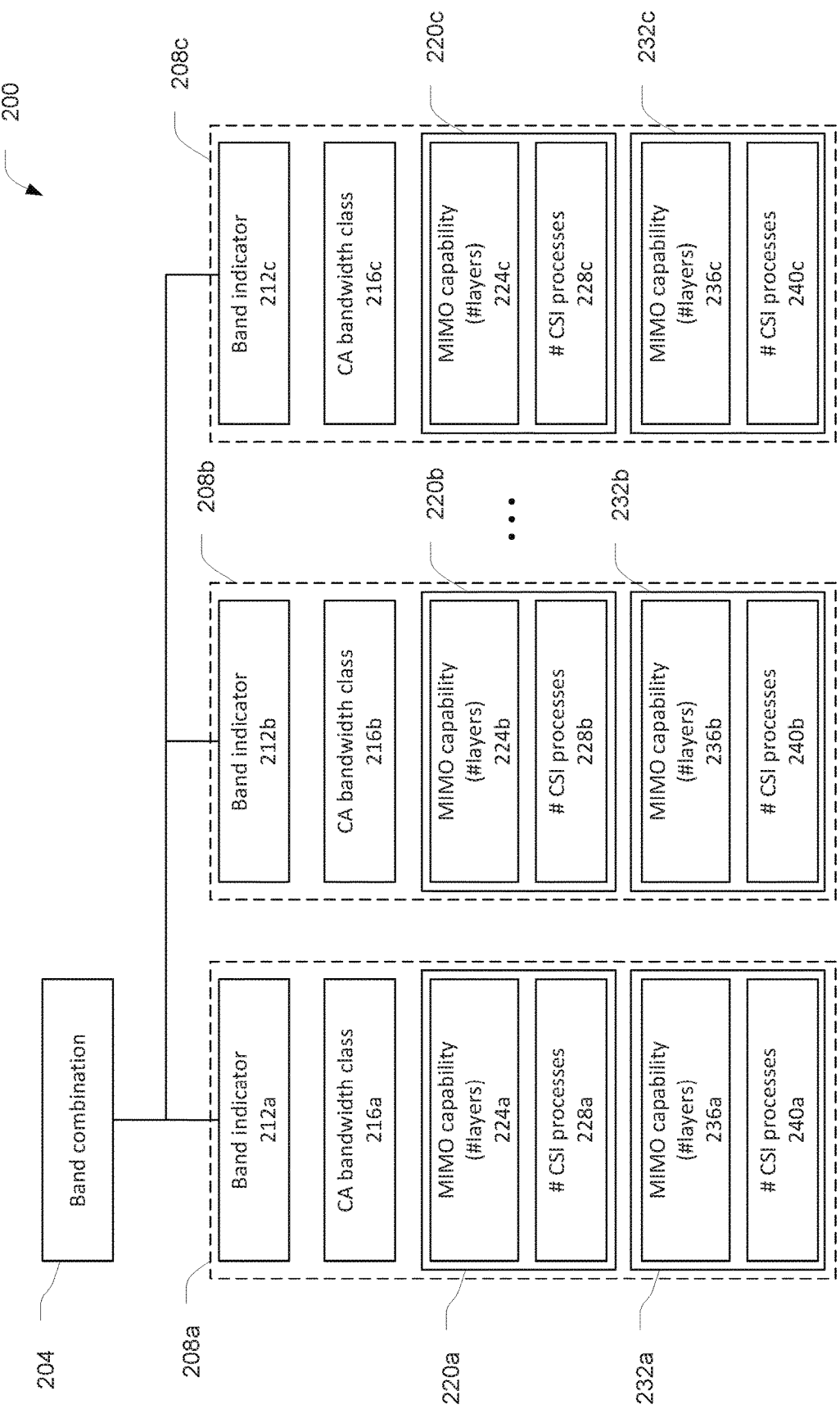
FIG. 2 is a diagram illustrating a structure of a user equipment (UE) capability report in accordance with some embodiments.

FIG. 2 is a diagram illustrating a structure 200 of a UE capability report that provides information regarding MIMO/CSI process combinations in accordance with some embodiments. The structure 200 may be used to report the MIMO capabilities and CSI processes per band per band combination.

The structure 200 may correspond to a band combination 204. The band combination 204 may include band parameters 208a, 208b, and 208c. Three band parameters are shown; however, other embodiments may include other numbers of band parameters.

Each band parameter 208 may include a band indicator 212 to provide an indicator of a frequency band within the band combination 204. Each band parameter 208 may further include a CA bandwidth class 216 that corresponds to the particular band indicated by the band indicator 212.

Each band parameter 208 may further include one or more MIMO/CSI process combination sets. In particular, as shown in FIG. 2, each band parameter 208 includes a first MIMO/CSI process combination set 220, which includes a MIMO capability 224 and a number of CSI processes 228, and a second MIMO/CSI process combination set 232, which includes a MIMO capability 236 and a number of CSI processes 240.

The MIMO capabilities may represent a number of layers that may be used with a particular MIMO/CSI process combination set.

If a band parameter includes a plurality of MIMO/CSI process combination sets, all of the MIMO/CSI process combination sets included in other band parameters can be combined among each other. For example, assume: band 1 includes sets "A" and "B" of MIMO/CSI process; band 2 includes sets "C" and "D" of MIMO/CSI process; and band 3 includes sets "E" and "F" of MIMO/CSI process. Any combination including one MIMO/CSI process from each band can be configured by the network for a band combination of <1, 2, 3> including: ACE; ADF; BCE; BDF; ADE; etc. In total, there may be eight valid combinations that can be configurable for MIMO/CSI processes (not just limited to ACE or BDF).

In other embodiments, MIMO/CSI process capability may be signaled per frequency band instead of per band per band combination. For example, the UE 112 may indicate that, for a particular band 1, it supports a certain number of layers and CSI processes for a particular bandwidth class. For example, the UE may indicate that, for band 1 it supports 2 layers and 2 CSI processes for BWC A; and 1 layer and 4 CSI processes for BWC C. Thus, any band combination that includes CA configuration 1A (band 1 and BWC A) will support 2/2 MIMO/CSI process capability, regardless of other CA configurations included in the band combination (e.g., 1A_5C; 1A_2A, . . . ). Any band combination that includes CA configuration 1C (band 1 and BWC C) will support ¼ MIMO/CSI process capability, regardless of other CA configurations included in the band combination (e.g., 1C_5C; 1C_5B, . . . ).

In some embodiments, the UE 112 may indicate MIMO/CSI processes for a bandwidth class per frequency band regardless of which other band Some embodiments provide the decoupling of the signaling of uplink and downlink band parameters to reduce signaling overhead in UE capability responses. Previously, a UE would need to provide supported uplink CA bandwidth class and the corresponding MIMO capability for at least one band in a band combination. Following this rule, certain band parameters (including carrier aggregation and MIMO capabilities) might be repeated in many supported band combinations for a given UE.

For example, assume a legacy UE supports DL in bands 2, 4, 7, and 9 and 1 UL in each of the four bands. Thus, with previous capability signaling, four supported band combination IEs must be included: (1) DL bands 2, 4, 7, and 9+UL band 2; (2) DL bands 2, 4, 7, and 9+UL band 4; (3) DL bands 2, 4, 7, and 9+UL band 7; and (4) DL bands 2, 4, 7, and 9+UL band 9. As can be seen, the DL band indications may be unnecessarily repeated in each band combination IE.

To reduce the size of UE capability reports, some embodiments may include, in a band combination IE, an indication of which of the bands that support DL also support UL in different band combinations. This may be done by using a bitmap that can be included for each uplink band combination. If the UE 112 supports UL in one band per band combination, a band combination supporting DL in N bands will have a bitmap of N bits.

So, with reference to the above scenario in which a UE supports DL in bands 2, 4, 7, and 9 and 1 UL in each of the four bands, embodiments may provide one IE with a bitmap string to eliminate the redundant DL band indications. For example, one supported band combination may indicate: DL bands 2, 4, 7, and 9+<b0, b1, b2, b3>. The bits of the bitmap may indicate whether each band of the DL also supports UL in a band combination. For the above example, each bit of the bitmap may be set to 1 to indicate that each of bands 2, 4, 7, and 9 can support an UL under separate band combinations. An embodiment having the first two bits of the bitmap set to 1 and the rest set to 0 may indicate two band combinations: (1) DL bands 2, 4, 7, and 9+UL band 2; and (2) DL bands 2, 4, 7, and 9+UL band 4.

If the UE supports an UL in up to two bands in each band combination, the UE band combination IE may include two sets of bitmaps, one for the first uplink band combination and the other for the second uplink band combination. As an example of UE supports up to five UL bands in total, then the bitmap size of two uplink band combinations choosing among the 5 candidate UL bands is $C(5,2)=(_2^5)=5!/((5-2)!2!)=10$.

Figure 3:
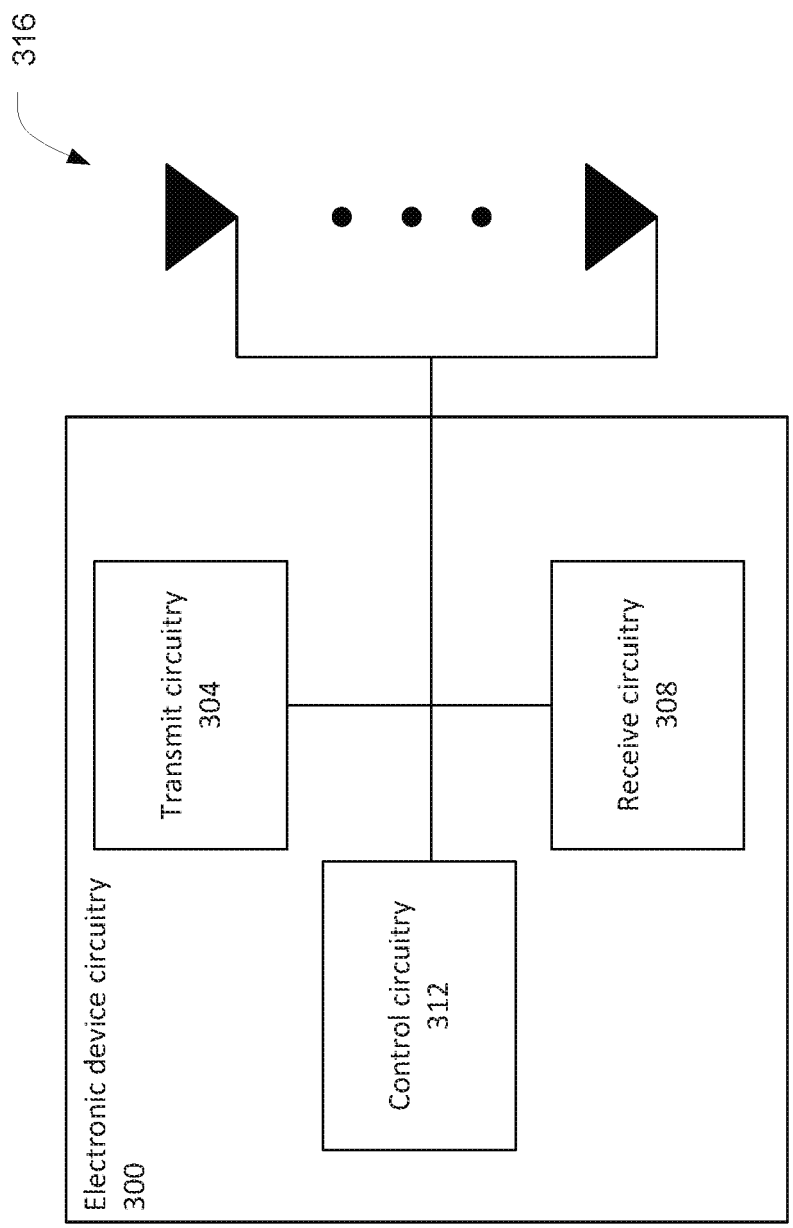
FIG. 3 illustrates electronic device circuitry in accordance with some embodiments.

FIG. 3 illustrates electronic device circuitry 300 in accordance with some embodiments. In some embodiments, the electronic device circuitry 300 may be, or may be incorporated into or otherwise a part of, a UE such as UE 112 or an eNB such as eNB 104. In embodiments, the electronic device circuitry 300 may include transmit circuitry 304 and receive circuitry 308 coupled with control circuitry 312. In embodiments, the transmit circuitry 304 and/or receive circuitry 308 may be elements or modules of transceiver circuitry. The electronic device circuitry 300 may be coupled with one or more plurality of antenna elements of one or more antennas 316.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

The components of the electronic device circuitry 300 may be configured to perform operations similar to those described elsewhere in this disclosure with respect to eNB 104 or UE 112. In some embodiments the electronic device circuitry 300, incorporated into or otherwise part of UE 112, may be configured to perform a method such as that described with respect to FIG. 4. In some embodiments the electronic device circuitry 300, incorporated into or otherwise part of eNB 104, may be configured to perform a method such as that described with respect to FIG. 5.

In general, the control circuitry 312 may generate and process control messages such as UE capability requests and UE capability responses. The control circuitry 312 may control the transmit circuitry 304 to transmit the control messages and may control the receive circuitry 308 to receive the control messages.

Figure 4:
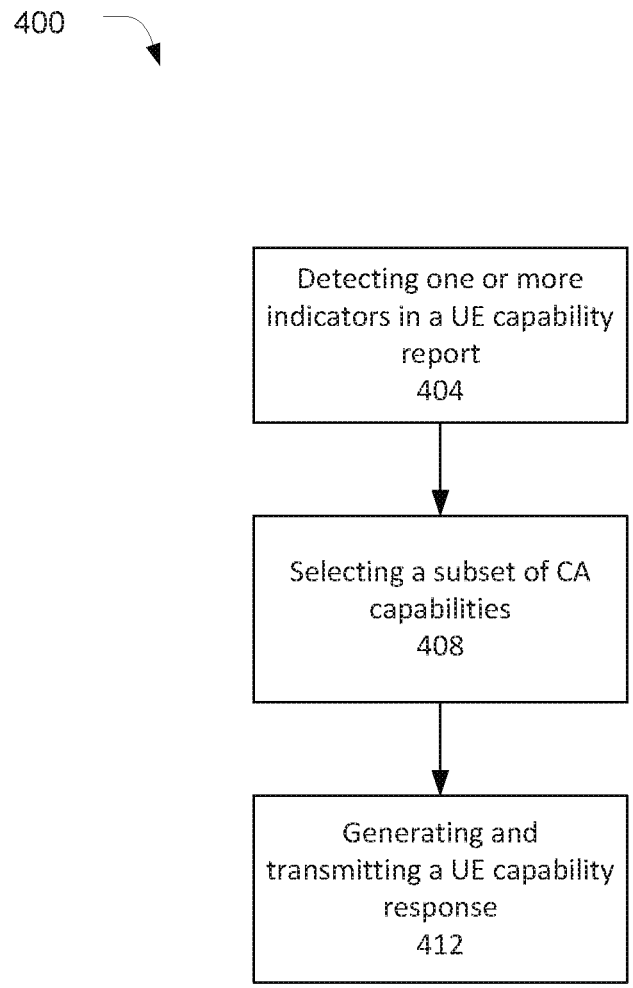
FIG. 4 is a flowchart depicting UE capability request operations of an evolved node B (eNB) in accordance with some embodiments.

FIG. 4 is a flowchart depicting a UE capability operation 400 in accordance with some embodiments. The UE capability operation 400 may be performed by UE 112. In some embodiments, the operation 400 may be performed by components of electronic device circuitry 300.

The UE capability operation 400 may include, at 404, detecting one or more indicators in a UE capability report. The UE capability report may be received by receive circuitry 308, which may provide various receive operations such as decoding, demodulating, etc. prior to providing a control data transmitted in the UE capability report to the control circuitry 312. The control circuitry 312 may detect the one or more indicators from the control data received from the receive circuitry 308. In some embodiments, the one or more indicators may be included in one or more fields of IEs included in the UE capability report. The one or more indicators may indicate one or more functions, CA BWCs, MIMO capabilities, CSI process numbers, or number of component carriers as described herein.

The UE capability operation 400 may include, at 408, selecting a subset of CA capabilities of the UE 112 based on the one or more indicators. In embodiments in which the indicators indicate one or more functions, the control circuitry 312 may select a subset of CA capabilities to exclude capabilities that relate to the one or more functions. The functions may include, but are not limited to, dual connectivity; multiple timing advance; simultaneous transmit and receive; NAICS; sidelink direct communication support; transmission mode; or supported bandwidth combination set. In some embodiments, the indicators may provide an indication of certain band combinations for which capability information for the identified functions is to be excluded.

In some embodiments, the indicators may indicate CA BWCs or combinations of CA BWC/MIMO capabilities that may be used to select the subset of CA capabilities.

In some embodiments, the control circuitry 312 may determine that the UE capability request requests information regarding a first category of capabilities that are not supported by the UE 112. In these embodiments, the UE 112 may, as an alternative, select the CA capabilities to include a second category of capabilities that are related to, but less than, the first category of capabilities.

The operation 400 may include, at 412, generating and transmitting a UE capability response. The control circuitry 312 may generate the UE capability response with information related to the subset of CA capabilities. For example, in some embodiments the information may include a band combination structure such as that shown and described with respect to FIG. 2.

In some embodiments, the information included in the UE capability response may indicate that the UE 112 has capabilities beyond the selected subset of CA capabilities included in the UE capability response.

In some embodiments, the information may include a reference to a predetermined list of MIMO/CSI combination sets. The UE 112 may be preconfigured with the predetermined list, dynamically configured with the predetermined list (for example, through RRC signaling, or may generate the predetermined list based on parameters, for example, size parameters previously provided by the eNB 104.

Figure 5:
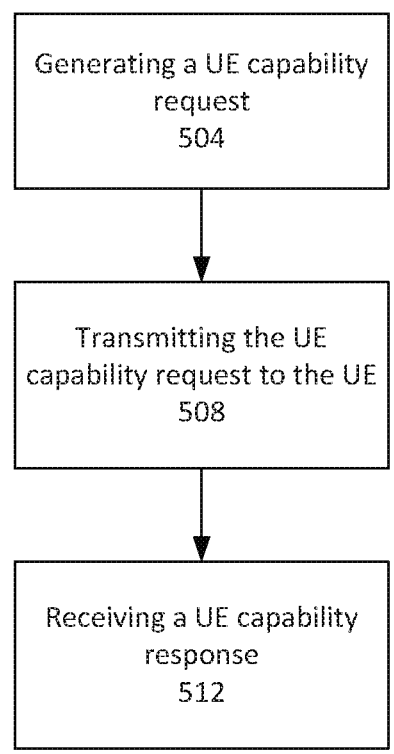
FIG. 5 is a flowchart depicting UE capability report operations of a UE in accordance with some embodiments.

FIG. 5 is a flowchart depicting a UE capability operation 500 in accordance with some embodiments. The UE capability operation 500 may be performed by the eNB 104. In some embodiments, the operation 500 may be performed by components of electronic device circuitry 300.

The UE capability operation 500 may include, at 504, generating a UE capability request. The UE capability request may be generated by the control circuitry 312. The UE capability request may include the one or more indicators designed to reduce a size of UE capability reporting as described herein. For example, the UE capability request may include indicators to indicate one or more functions, CA BWCs, MIMO capabilities, CSI process numbers, or maximum number of DL component carriers or UL component carriers or both that may be used by the UE 112 to select a subset of CA capabilities. The indicators may be included in one or more fields of information elements included in the UE capability enquiry message.

The operation 500 may, at 508, include transmitting the UE capability request to the UE 112. In some embodiments, the control circuitry 312 may control the transmit circuitry 304 to transmit the UE capability request. In some embodiments, the UE capability request may be transmitted in a UECapabilityEnquiry message.

The operation 500 may, at 512, include receiving a UE capability response. In some embodiments, the control circuitry 312 may receive the UE capability response from the receive circuitry 308 after the receive circuitry 308 has performed initial receive processing.

Figure 6:
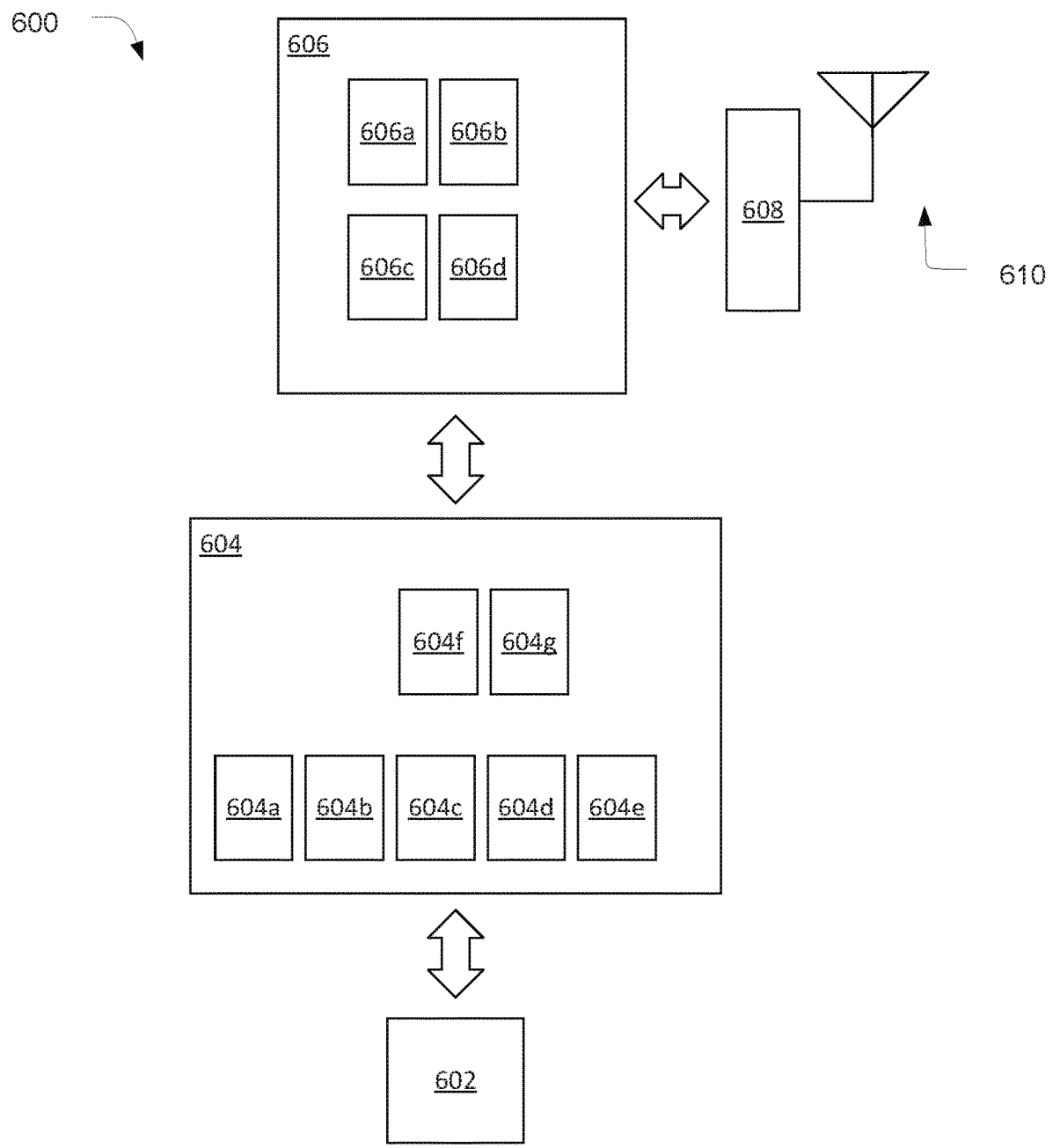
FIG. 6 schematically illustrates a system in accordance with some embodiments.

Embodiments described herein may be implemented into a system using any suitably configured hardware and/or software. FIG. 6 illustrates, for one embodiment, example components of an electronic device 600. In embodiments, the electronic device 600 may be a UE (for example, UE 112) or an eNB (for example, eNB 104). In some embodiments, the electronic device 600 may include application circuitry 602, baseband circuitry 604, radio frequency (RF) circuitry 606, front-end module (FEM) circuitry 600 may and one or more antennas 608, coupled together at least as shown.

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 604 may include circuitry such as, but not limited to, one or more single-core or multi-core processors. The baseband circuitry 604 may include one or more baseband processors and/or control logic to process baseband signals received from a receive signal path of the RF circuitry 606 and to generate baseband signals for a transmit signal path of the RF circuitry 606. Baseband processing circuity 604 may interface with the application circuitry 602 for generation and processing of the baseband signals and for controlling operations of the RF circuitry 606. For example, in some embodiments, the baseband circuitry 604 may include a second generation (2G) baseband processor 604a, third generation (3G) baseband processor 604b, fourth generation (4G) baseband processor 604c, and/or other baseband processor(s) 604d for other existing generations, generations in development or to be developed in the future (e.g., fifth generation (5G), 6G, etc.). The baseband circuitry 604 (e.g., one or more of baseband processors 604a-d) may handle various radio control functions that enable communication with one or more radio networks via the RF circuitry 606. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, and/or constellation mapping/demapping functionality. In some embodiments, encoding/decoding circuitry of the baseband circuitry 604 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include elements of a protocol stack such as, for example, elements of an evolved universal terrestrial radio access network (E-UTRAN) protocol including, for example, physical (PHY), media access control (MAC), radio link control (RLC), packet data convergence protocol (PDCP), and/or radio resource control (RRC) elements. A central processing unit (CPU) 604e of the baseband circuitry 604 may be configured to run elements of the protocol stack for signaling of the PHY, MAC, RLC, PDCP and/or RRC layers. In some embodiments, the baseband circuitry may include one or more audio digital signal processor(s) (DSP) 604f. The audio DSP(s) 604f may include elements for compression/decompression and echo cancellation and may include other suitable processing elements in other embodiments.

The baseband circuitry 604 may further include memory/storage 604g. The memory/storage 604g may be used to load and store data and/or instructions for operations performed by the processors of the baseband circuitry 604. Memory/storage for one embodiment may include computer-readable media embodied in any combination of suitable volatile memory and/or non-volatile memory. The memory/storage 604g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 604g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (E-UTRAN) and/or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

The baseband circuitry 604 may include the control, receive, and transmit circuitries as discussed with respect to FIG. 3. In some embodiments, some or all of the receive and transmit circuitries may be incorporated into RF circuitry 606.

RF circuitry 606 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 606 may include a receive signal path that may include circuitry to down-convert RF signals received from the FEM circuitry 608 and provide baseband signals to the baseband circuitry 604. RF circuitry 606 may also include a transmit signal path that may include circuitry to up-convert baseband signals provided by the baseband circuitry 604 and provide RF output signals to the FEM circuitry 608 for transmission.

In some embodiments, the RF circuitry 606 may include a receive signal path and a transmit signal path. The receive signal path of the RF circuitry 606 may include mixer circuitry 606a, amplifier circuitry 606b and filter circuitry 606c. The transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c. The filter circuitry 606c may include a low-pass filter (LPF), although the scope of the embodiments is not limited in this respect.

In some embodiments, the mixer circuitry 606a of the receive signal path and the mixer circuitry 606a of the transmit signal path may include two or more mixers and may be arranged for quadrature downconversion and/or upconversion respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a of the transmit signal path may be arranged for direct downconversion and/or direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path that may include circuitry configured to operate on RF signals received from one or more antennas 610, amplify the received signals and provide the amplified versions of the received signals to the RF circuitry 606 for further processing. FEM circuitry 608 may also include a transmit signal path that may include circuitry configured to amplify signals for transmission provided by the RF circuitry 606 for transmission by one or more of the one or more antennas 610.

In some embodiments, the FEM circuitry 608 may include a TX/RX switch to switch between transmit mode and receive mode operation. The FEM circuitry 608 may include a receive signal path and a transmit signal path. The receive signal path of the FEM circuitry 608 may include a low-noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In embodiments where the electronic device 600 is, implements, is incorporated into, or is otherwise part of a UE, the radio frequency (RF) circuitry 606 may be to receive information in a control message requesting a capability report. The baseband circuitry 604 may be to identify at least one band combination information based on the first control information. The RF circuitry 606 may be further to transmit the at least one band combination information based on the first control information.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 7:
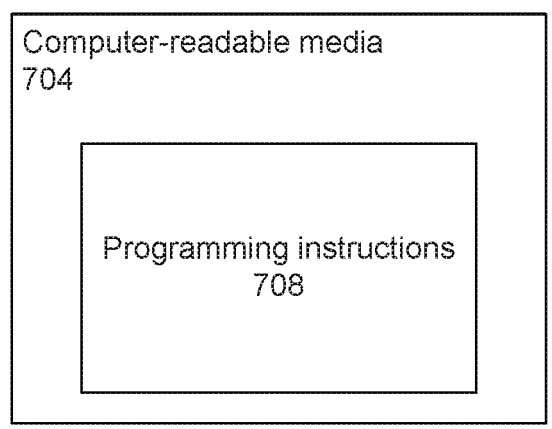
FIG. 7 schematically illustrates a computer-readable media in accordance with some embodiments.

FIG. 7 illustrates an example computer-readable media 704 that may be suitable for use to store instructions that cause an apparatus, in response to execution of the instructions by the apparatus, to practice selected aspects of the present disclosure. In some embodiments, the computer-readable media 704 may be non-transitory. As shown, computer-readable media 704 may include programming instructions 708. Programming instructions 708 may be configured to enable a device, e.g., eNB 104, UE 106, and/or similar computing devices, in response to execution of the programming instructions 708, to implement (aspects of) any of the methods and/or elements described throughout this disclosure, including the methods described in relation to the eNB 104 and UE 104 of FIG. 1, the electronic device circuitry 300 of FIG. 3, the UE capability operations of FIGS. 4 and 5, or the electronic device 600 of FIG. 6. In some embodiments, programming instructions 708 may be disposed on computer-readable media 704 that is transitory in nature, such as signals.

Any combination of one or more computer-usable or computer-readable media may be utilized. The computer-usable or computer-readable media may be, for example but not limited to, an electronic, magnetic, optical, electromagnetic, infrared, or semiconductor system, apparatus, device, or propagation medium. More specific examples (a non-exhaustive list) of the computer-readable media would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable media could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable media may be any medium that can contain, store, communicate, propagate, or transport the program for use by or in connection with the instruction execution system, apparatus, or device. The computer-usable media may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart and/or block diagram block or blocks.

Example 1 includes one or more computer-readable media, which may be non-transitory, having instructions that, when executed, cause a user equipment (UE) to: detect one or more indicators in a UE capability request that requests capability information from the UE, the one or more indicators to indicate one or more functions, carrier aggregation (CA) bandwidth classes (BWCs), multiple input multiple output (MIMO) capabilities, channel state information (CSI) process numbers, or number of component carriers; select a subset of CA capabilities of the UE based on the one or more indicators; generate a UE capability response that includes information related to the subset of CA capabilities; and transmit the UE capability response.

Example 2 includes the one or more computer-readable media of example 1, wherein the one or more indicators are to indicate a maximum number of downlink component carriers (CCs) or a maximum number of uplink CCs.

Example 3 includes one or more computer-readable media of example 1, wherein the one or more indicators indicate one or more functions and the instructions, when executed, further cause the UE to: select the subset of CA capabilities to exclude capabilities that relate to the one or more functions.

Example 4 includes one or more computer-readable media of example 3, wherein the one or more functions includes: dual connectivity; multiple timing advance; simultaneous transmit and receive; network-assisted interference cancellation and suppression; sidelink direct communication support; transmission mode; or supported bandwidth combination set.

Example 5 includes one or computer-readable media of example 3, wherein the instructions, when executed, further cause the UE to: identify one or more band combinations based on the one or more indicators; and identify the one or more functions within the one or more band combinations.

Example 6 includes the one or more computer-readable media of any one of examples 1-5, wherein the one or more indicators are to indicate one or more CA BWCs or one or more combinations of CA BWC and MIMO capabilities.

Example 7 includes the one or more computer-readable media of any one of examples 1-6, wherein the instructions, when executed, further cause the UE to: determine the UE capability request requests information regarding a first category of capabilities that are not supported by the UE; and select the subset of CA capabilities to include a second category of capabilities that is related to, but less than, the first category of capabilities.

Example 8 includes the one or more computer-readable media of any one of examples 1-7, wherein the instructions, when executed, further cause the UE to: generate the UE capability response to indicate that the UE includes capabilities beyond the selected subset of CA capabilities.

Example 9 includes the one or more computer-readable media of example 8, wherein the UE capability response includes a plurality of bits that correspond to a respective plurality of UE capabilities that are not included in the selected subset of CA capabilities.

Example 10 includes the one or more computer-readable media of any one of examples 1-9, wherein the information related to the subset of CA capabilities comprises an indication of a multiple input multiple output (MIMO)/channel state information (CSI) combination set, the MIMO/CSI combination set to include a supported MIMO capability and CSI process number.

Example 11 includes the one or more computer-readable media of example 10, wherein the indication of the MIMO/CSI combination set refers to a predetermined list of MIMO/CSI combination sets.

Example 12 includes the one or more computer-readable media of example 11, wherein the instructions, when executed, further cause the UE to: determine a maximum number of MIMO/CSI process combination sets allowed by a network; generate the predetermined list with a number that is less than or equal to the maximum number; and transmit the predetermined list to the eNB.

Example 13 includes the one or more computer-readable media of any one of examples 10-12, wherein the MIMO/CSI combination set corresponds to a band combination or a CA bandwidth for a set of band combinations.

Example 14 includes the one or more computer-readable media of any one of examples 1-13, wherein the UE capability response includes a band combination structure with a plurality of band parameters.

Example 15 includes the one or more computer-readable media of example 14, wherein individual band parameters of the plurality of band parameters include a band indicator, a CA bandwidth class, and one or more MIMO/CSI process combination sets.

Example 16 includes the one or more computer-readable media of any one of examples 1-15, wherein the one or more indicators indicate a number of component carriers, and the subset of CA capabilities correspond to bandwidth combinations supported by the UE that include no more than the number of component carriers.

Example 17 includes an apparatus comprising: the one or more computer-readable media of any one of examples 1-16; and one or more processors, coupled with the one or more computer-readable media to execute the instructions.

Example 18 includes an apparatus comprising: control circuitry to generate a UE capability request that requests capability information from a user equipment (UE), the UE capability request to include one or more indicators to indicate one or more of functions, carrier aggregation (CA) bandwidth classes (BWCs), multiple input multiple output (MIMO) capabilities, channel state information (CSI) process numbers, or number of component carriers; transmit circuitry, coupled with the control circuitry, to transmit the UE capability request to the UE; and receive circuitry, coupled with the control circuitry, to receive a UE capability response that includes information related to a subset of CA capabilities of the UE selected based on the one or more indicators.

Example 19 includes the apparatus of example 18, wherein the one or more indicators indicate one or more functions and the subset of CA capabilities is to exclude capabilities that relate to the one or more functions.

Example 20 includes the apparatus of example 19, wherein the one or more functions includes: dual connectivity; multiple timing advance; simultaneous transmit and receive; network-assisted interference cancellation and suppression; sidelink direct communication support; transmission mode; or supported bandwidth combination set.

Example 21 includes the apparatus of any one of examples 18-20, wherein the information related to the subset of CA capabilities comprises an indication of a MIMO/CSI combination set, the MIMO/CSI combination set to include a supported MIMO capability and CSI process number.

Example 22 includes the apparatus of example 21, wherein the control circuitry is to reference a predetermined list of MIMO/CSI combination sets stored at the apparatus based on the indication of the MIMO/CSI combination set.

Example 23 includes the apparatus of example 22, wherein the control circuitry is to receive the predetermined list from the UE.

Example 24 includes the apparatus of example 22, wherein the control circuitry is to control the transmit circuitry to transmit a maximum number of MIMO/CSI process combination sets allowed by a network to the UE to restrict a size of the predetermined list.

Example 25 includes an apparatus comprising: one or more storage media having instructions; and one or more processors (for example, baseband processors), coupled with the one or more storage media, to execute the instructions to cause the apparatus to: identify, in a user equipment (UE) capability request that requests capability information from the apparatus, one or more indicators; select a subset of carrier aggregation (CA) capabilities of the apparatus based on the one or more indicators; generate a UE capability response that includes information related to the subset of CA capabilities, the information to include an indication of a multiple input multiple output (MIMO)/channel state information (CSI) combination set, the MIMO/CSI combination set to include a supported MIMO capability and CSI process number; and transmit the UE capability response.

Example 26 includes the apparatus of example 25, wherein the indication of the MIMO/CSI combination set refers to a predetermined list of MIMO/CSI combination sets.

Example 27 includes the apparatus of example 25 or 26, wherein the one or more processors are further to: determine a maximum number of MIMO/CSI process combination sets allowed by a network; generate the predetermined list with a number that is less than or equal to the maximum number; and transmit the predetermined list to an evolved node B (eNB).

Example 28 includes the apparatus of any one of examples 25-27, wherein the MIMO/CSI combination set corresponds to a band combination or a CA bandwidth for a set of band combinations.

Example 29 includes the apparatus of any one of examples 25-27, wherein the UE capability response includes a band combination structure with a plurality of band parameters.

Example 30 includes the apparatus of example 29, wherein individual band parameters of the plurality of band parameters include a band indicator, a CA bandwidth class, and one or more MIMO/CSI process combination sets.

Example 31 includes the apparatus of any one of examples 25-30, wherein the one or more indicators indicate a number of component carriers, and the subset of CA capabilities correspond to bandwidth combinations supported by the UE that include no more than the number of component carriers.

Example 32 includes a method of operating a user equipment (UE) comprising: detecting one or more indicators in a UE capability request that requests capability information from the UE, the one or more indicators to indicate one or more functions, carrier aggregation (CA) bandwidth classes (BWCs), multiple input multiple output (MIMO) capabilities, channel state information (CSI) process numbers, or number of component carriers; selecting a subset of CA capabilities of the UE based on the one or more indicators; generating a UE capability response that includes information related to the subset of CA capabilities; and transmitting the UE capability response.

Example 33 includes the method of example 32, wherein the one or more indicators are to indicate a maximum number of downlink component carriers (CCs) or a maximum number of uplink CCs.

Example 34 includes the method of example 32, wherein the one or more indicators indicate one or more functions and the method further comprises: selecting the subset of CA capabilities to exclude capabilities that relate to the one or more functions.

Example 35 includes the method of example 34, wherein the one or more functions includes: dual connectivity; multiple timing advance; simultaneous transmit and receive; network-assisted interference cancellation and suppression; sidelink direct communication support; transmission mode; or supported bandwidth combination set.

Example 36 includes the method of example 34, further comprising: identifying one or more band combinations based on the one or more indicators; and identifying the one or more functions within the one or more band combinations.

Example 37 includes the method of any one of examples 32-36, wherein the one or more indicators are to indicate one or more CA BWCs or one or more combinations of CA BWC and MIMO capabilities.

Example 38 includes the method of any one of examples 32-37, further comprising: determining the UE capability request requests information regarding a first category of capabilities that are not supported by the UE; and selecting the subset of CA capabilities to include a second category of capabilities that is related to, but less than, the first category of capabilities.

Example 39 includes the method of any one of examples 32-38, further comprising: generating the UE capability response to indicate that the UE includes capabilities beyond the selected subset of CA capabilities.

Example 40 includes the method of example 39, wherein the UE capability response includes a plurality of bits that correspond to a respective plurality of UE capabilities that are not included in the selected subset of CA capabilities.

Example 41 includes the method of any one of examples 32-40, wherein the information related to the subset of CA capabilities comprises an indication of a MIMO/CSI combination set, the MIMO/CSI combination set to include a supported MIMO capability and CSI process number.

Example 42 includes the method of example 41, wherein the indication of the MIMO/CSI combination set refers to a predetermined list of MIMO/CSI combination sets.

Example 43 includes the method of example 42, further comprising: determining a maximum number of MIMO/CSI process combination sets allowed by a network; generating the predetermined list with a number that is less than or equal to the maximum number; and transmitting the predetermined list to the eNB.

Example 44 includes the method of any one of examples 41-43, wherein the MIMO/CSI combination set corresponds to a band combination or a CA bandwidth for a set of band combinations.

Example 45 includes the method of any one of examples 32-44, wherein the UE capability response includes a band combination structure with a plurality of band parameters.

Example 46 includes the method of example 45, wherein individual band parameters of the plurality of band parameters include a band indicator, a CA bandwidth class, and one or more MIMO/CSI process combination sets.

Example 47 includes the method of any one of examples 32-46, wherein the one or more indicators indicate a number of component carriers, and the subset of CA capabilities correspond to bandwidth combinations supported by the UE that include no more than the number of component carriers.

Example 48 includes a method comprising: generating a UE capability request that requests capability information from a user equipment (UE), the UE capability request to include one or more indicators to indicate one or more of functions, carrier aggregation (CA) bandwidth classes (BWCs), multiple input multiple output (MIMO) capabilities, channel state information (CSI) process numbers, or number of component carriers; transmitting the UE capability request to the UE; and receiving a UE capability response that includes information related to a subset of CA capabilities of the UE selected based on the one or more indicators.

Example 49 includes the method of example 48, wherein the one or more indicators indicate one or more functions and the subset of CA capabilities is to exclude capabilities that relate to the one or more functions.

Example 50 includes the method of example 49, wherein the one or more functions includes: dual connectivity; multiple timing advance; simultaneous transmit and receive; network-assisted interference cancellation and suppression; sidelink direct communication support; transmission mode; or supported bandwidth combination set.

Example 51 includes the method of any one of examples 48-50, wherein the information related to the subset of CA capabilities comprises an indication of a MIMO/CSI combination set, the MIMO/CSI combination set to include a supported MIMO capability and CSI process number.

Example 52 includes the method of example 51, further comprising referencing a predetermined list of MIMO/CSI combination sets based on the indication of the MIMO/CSI combination set.

Example 53 includes the method of example 52, further comprising receiving the predetermined list from the UE.

Example 54 includes the method of example 52, further comprising transmiting a maximum number of MIMO/CSI process combination sets allowed by a network to the UE to restrict a size of the predetermined list.

Example 55 includes a method of operating an apparatus comprising: identifying, in a user equipment (UE) capability request that requests capability information from the apparatus, one or more indicators; selecting a subset of carrier aggregation (CA) capabilities of the apparatus based on the one or more indicators; generating a UE capability response that includes information related to the subset of CA capabilities, the information to include an indication of a multiple input multiple output (MIMO)/channel state information (CSI) combination set, the MIMO/CSI combination set to include a supported MIMO capability and CSI process number; and transmitting the UE capability response.

Example 56 includes the method of example 55, wherein the indication of the MIMO/CSI combination set refers to a predetermined list of MIMO/CSI combination sets.

Example 57 includes the method of example 55 or 56, further comprising: determining a maximum number of MIMO/CSI process combination sets allowed by a network; generating the predetermined list with a number that is less than or equal to the maximum number; and transmitting the predetermined list to an evolved node B (eNB).

Example 58 includes the method of any one of examples 55-57, wherein the MIMO/CSI combination set corresponds to a band combination or a CA bandwidth for a set of band combinations.

Example 59 includes the method of any one of examples 55-57, wherein the UE capability response includes a band combination structure with a plurality of band parameters.

Example 60 includes the method of example 59, wherein individual band parameters of the plurality of band parameters include a band indicator, a CA bandwidth class, and one or more MIMO/CSI process combination sets.

Example 61 includes the method of any one of examples 55-60, wherein the one or more indicators indicate a number of component carriers, and the subset of CA capabilities correspond to bandwidth combinations supported by the UE that include no more than the number of component carriers.

Example 62 includes one or more computer-readable media, which may be non-transitory, that include instructions that, when executed, cause a device to perform any one of the methods of examples 32-61.

Example 63 includes an apparatus configured to perform any one of the methods of examples 32-61.

Example 64 includes an apparatus having means configured to perform any one of the methods of examples 32-61.

The description herein of illustrated implementations, including what is described in the Abstract, is not intended to be exhaustive or to limit the present disclosure to the precise forms disclosed. While specific implementations and examples are described herein for illustrative purposes, a variety of alternate and/or equivalent embodiments or implementations calculated to achieve the same purposes may be made in light of the above detailed description, without departing from the scope of the present disclosure, as those skilled in the relevant art will recognize.

What is claimed is:

1. One or more non-transitory, computer-readable media having instructions that, when executed, cause a user equipment (UE) to:
   detect one or more indicators in a UE capability request message that requests capability information from the UE, the one or more indicators to indicate a maximum number of uplink component carriers (CCs);
   select, based on the one or more indicators, a subset of band combinations that are supported by the UE and include no more than the maximum number of uplink CCs;
   generate a UE capability response message that includes information related to the subset of band combinations;
   determine the UE capability request message further requests information regarding a first category of capabilities that are not supported by the UE;
   select a subset of carrier aggregation (CA) capabilities to include a second category of capabilities that is related to, but less than, the first category of capabilities; and
   cause the UE capability response message to be transmitted.

2. The one or more non-transitory computer-readable media of claim 1, wherein the instructions, when executed, further cause the UE to:
   identify one or more functions within the subset of band combinations; and
   generate the UE capability response message to include an indication of the one or more functions.

3. The one or more non-transitory computer-readable media of claim 1, wherein the instructions, when executed, further cause the UE to:
   select, based on the UE capability request message, a subset of carrier aggregation (CA) capabilities; and
   generate the UE capability response to indicate that the UE includes capabilities beyond the selected subset of CA capabilities.

4. The one or more non-transitory computer-readable media of claim 3, wherein the UE capability response includes a plurality of bits that correspond to a respective plurality of UE capabilities that are not included in the selected subset of CA capabilities.

5. The one or more non-transitory, computer-readable media of claim 1, wherein the one or more indicators are to restrict reporting of carrier aggregation (CA) band combinations and non-CA bands supported by the UE.

6. An apparatus comprising:
   first processing circuitry to:
      identify, in a user equipment (UE) capability request message that requests capability information from the apparatus, one or more indicators that are to indicate a maximum number of uplink component carriers (CCs); and select, based on the one or more indicators, a subset of band combinations that are supported by a UE and include no more than the maximum number of uplink CCs;

generate a UE capability response message that includes information related to a subset of carrier aggregation (CA) capabilities;

determine that the UE capability request message further requests information regarding a first category of capabilities that are not supported by the UE, wherein the subset of CA capabilities include a second category of capabilities that is related to, but less than, the first category of capabilities; and second processing circuitry to control transmission of the UE capability response message.

7. The apparatus of claim 6, wherein the UE capability response message is to include a band combination structure with a plurality of band parameters.

8. The apparatus of claim 7, wherein individual band parameters of the plurality of band parameters include a band indicator, a carrier aggregation (CA) bandwidth class, and one or more multiple input multiple output (MIMO)/channel state information (CSI) process combination sets.

9. The apparatus of claim 6, wherein the first processing circuitry is to select a subset of carrier aggregation (CA) capabilities based on the UE capability request message, the subset of CA capabilities to include the subset of band combinations.

10. The apparatus of claim 6, wherein the one or more indicators are to restrict reporting of carrier aggregation (CA) band combinations and non-CA bands supported by the UE.

11. An apparatus comprising:

first processing circuitry to generate a UE capability request message that requests capability information from a user equipment (UE), the UE capability request message to include one or more indicators to indicate a maximum number of uplink component carriers (CCs) to restrict a capability report message to reporting of information on supported band combinations that include no more than the maximum number of uplink CCs, the UE capability request message further requesting information regarding a first category of capabilities that are not supported by the UE, wherein a subset of carrier aggregation (CA) capabilities include a second category of capabilities that is related to, but less than, the first category of capabilities;

second processing circuitry, coupled with the first processing circuitry, to control transmission of the UE capability request message to the UE.

12. The apparatus of claim 11, wherein the apparatus further includes third processing circuitry to control reception of the capability report message, from the UE, with information related to the subset of carrier aggregation (CA) capabilities that includes indications of a subset of band combinations that are supported by the UE and include no more than the maximum number of UL CCs.

13. The apparatus of claim 11, wherein the one or more indicators are to restrict reporting of carrier aggregation (CA) band combinations and non-CA bands supported by the UE.

* * * * *

UNITED STATES PATENT AND TRADEMARK OFFICE
CERTIFICATE OF CORRECTION

PATENT NO. : 10,757,566 B2
APPLICATION NO. : 15/743562
DATED : August 25, 2020
INVENTOR(S) : Hong He et al.

Page 1 of 1

It is certified that error appears in the above-identified patent and that said Letters Patent is hereby corrected as shown below:

On the Title Page

Column 2, other publications, Line 2, delete "PCT/U52015/067158" and insert -- PCT/US2015/067158 --;

Column 2, abstract, Line 16, delete "indicator" and insert -- indicators --;

In the Claims

Column 22, Line 37, in Claim 2, after "non-transitory" insert -- , --;

Column 22, Line 44, in Claim 3, after "non-transitory" insert -- , --; and

Column 22, Line 52, in Claim 4, after "non-transitory" insert -- , --.

Signed and Sealed this
Twentieth Day of October, 2020

Andrei Iancu
*Director of the United States Patent and Trademark Office*